US006498956B1

(12) United States Patent
Yang

(10) Patent No.: US 6,498,956 B1
(45) Date of Patent: Dec. 24, 2002

(54) METHOD OF AUTOMATICALLY FEEDING LUBRICATING OIL USING MICROCOMPUTER

(75) Inventor: Yun Jong Yang, Seoul (KR)

(73) Assignee: Korea Leading Technology Co., Ltd., Paju (KR)

( * ) Notice: Subject to any disclaimer, the term of this patent is extended or adjusted under 35 U.S.C. 154(b) by 0 days.

(21) Appl. No.: 09/519,730

(22) Filed: Mar. 3, 2000

(30) Foreign Application Priority Data

Dec. 2, 1999 (KR) ............................................. 99-54509

(51) Int. Cl.⁷ .............................. G05B 11/01; F01M 1/18
(52) U.S. Cl. ............................. 700/14; 184/6.4; 184/7.4
(58) Field of Search ............................ 700/90, 170, 11, 700/14, 17; 184/37, 39, 6.4, 7.4, 6.14; 222/333, 389; 417/411

(56) References Cited

U.S. PATENT DOCUMENTS

| 4,034,831 A | | 7/1977 | Gruett ........................ 184/81 |
| 4,095,674 A | | 6/1978 | Kido et al. .................. 184/6.1 |
| 4,284,174 A | | 8/1981 | Salvana et al. .............. 184/6.4 |
| 4,512,292 A | | 4/1985 | Hundertmark ............ 123/65 B |
| 4,572,422 A | | 2/1986 | Heuberger et al. ........ 229/117.3 |
| 5,038,892 A | * | 8/1991 | Maloney ..................... 184/7.4 |
| 5,050,707 A | | 9/1991 | Wilhelmsen ................. 184/87 |
| 5,195,612 A | * | 3/1993 | Hahn et al. .................. 184/6.4 |
| 5,402,913 A | | 4/1995 | Graf ........................... 222/63 |
| 5,404,966 A | | 4/1995 | Yang ........................... 184/39 |
| 5,409,084 A | | 4/1995 | Graf ........................... 184/39 |
| 5,460,243 A | | 10/1995 | Patterson ..................... 184/29 |
| 5,622,239 A | | 4/1997 | Orlitzky ...................... 184/6.12 |
| 5,634,531 A | | 6/1997 | Graf et al. ................... 184/37 |
| 5,788,012 A | * | 8/1998 | Yang ........................... 184/6.4 |
| 6,012,551 A | | 1/2000 | Raab ........................... 184/7.4 |
| 6,354,816 B1 | * | 3/2002 | Yang ........................... 417/411 |

FOREIGN PATENT DOCUMENTS

EP        0777077 A1 *  6/1997

\* cited by examiner

Primary Examiner—Paul P. Gordon
(74) Attorney, Agent, or Firm—Beyer Weaver & Thomas LLP

(57) ABSTRACT

A method of automatically feeding lubricating oil to bearing parts of various machine elements using a microcomputer whereby various settings, progress of the settings, and display of the operating state of a lubricating oil feeding apparatus can be easily identified in a user-oriented manner. According to the method, the remaining operating time is displayed on liquid crystal displays (LCDs) after the lubricating oil feeding apparatus is installed to facilitate the identification of the elapse of the operating time, the operation of a motor for discharging a set amount of lubricating oil is controlled, and various displays such as the overload of the motor, shortage of a battery capacity, elapse of the lubricating oil replacement time, etc., are displayed by icons on the LCDs. The method includes initializing the microcomputer to drive the lubricating oil discharge motor by one revolution when a power is initially supplied, setting a discharge amount of the lubricating oil, selecting and setting the number of operating months, controlling the operation of the motor so that the lubricating oil is discharged according to the set number of operating months, and displaying an elapse of the set operating months and various factors such as a trouble, shortage of the battery capacity, replacement time of the lubricating oil, etc., by icons and indicator lamps.

15 Claims, 4 Drawing Sheets

METHOD OF AUTOMATICALLY FEEDING LUBRICATING OIL USING MICROCOMPUTER

BACKGROUND OF THE INVENTION

1. Field of the Invention

The present invention relates to a method of automatically feeding lubricating oil to bearing parts of various machine elements. In particular, the present invention relates to an automatic lubricating oil feeding method using a microcomputer whereby various settings, progress of the settings, and display of the operating state of a lubricating oil feeding apparatus can be easily identified in a user-oriented manner.

2. Description of the Prior Art

In order to achieve the automatic lubricating oil feeding to machine elements such as bearings of various industrial equipments, diverse kinds of lubricating oil feeding techniques have been developed and used.

An automatic lubricating oil feeding apparatus using gas pressure has been developed to continuously feed the lubricating oil to bearings or other parts which require the lubricating oil to the exclusion of inconvenience of the manual operation.

According to this apparatus, a typical diaphragm is extended by the gas pressure of an electrochemical reactor, and this causes a piston to descend so as to discharge the lubricating oil (i.e., grease). The gas pressure is controlled by a control circuit in a manner that the amount of current, which corresponds to the gas reaction time of the electrochemical reactor, is adjusted by the control circuit, and this causes the discharge of the lubricating oil to be performed for a preset time in the range of one month to several or several tens of months.

Consequently, the above-described conventional apparatus can continuously feed the lubricating oil through the term set in the range of one month to several months by variably determining the current supplied to the electrochemical reactor (i.e., gas chamber) in accordance with the resistance value of a resistor selected by a switch and by adjusting the reaction time of the electrochemical reactor accordingly. In the apparatus, light emitting diodes which operate simultaneously with the selection operation of the switch are employed to display the operating state of the apparatus.

However, the conventional electric lubricating oil feeding apparatus has the drawbacks that since it controls the lubricating oil discharge time by adjusting the electrochemical reaction time by limiting the supplied current through a selected resistor, it cannot reflect the condition inside the bearing and the environmental change such as the change of temperature. Also, it cannot achieve an accurate discharge of lubricating oil with a proper amount in the preset time because the preset amount of current supplied to the electrochemical reactor is changed due to the change of the internal resistance value of the electrochemical reactor as the time elapses.

Further, according to the conventional apparatus, it is difficult for a user to identify the setting time of the lubricating oil feeding apparatus since the setting time of the apparatus should be identified by checking the state of the switches one by one. Also, even though the entire setting time elapses due to an external factor such as temperature, machine element, internal factor, etc., the user cannot identify such an abnormal elapse of time.

In order to solve the problems involved in the conventional lubricating oil feeding apparatus as described above, Korea Patent Number 189152 issued to the applicant discloses an automatic lubricating oil feeding method which includes an operating-term input step performed by a mode selection means to set the lubricating oil discharge time, an output step performed by a microcomputer to control the output time per unit time according to a set operating term, the microcomputer providing a computed output to an electrochemical reactor according to a selected mode and controlling a liquid crystal display (LCD) to display the set mode, a step of detecting the termination of the set operating term, and a step of rapidly discharging the remaining lubricating oil by deleting the set mode and resetting a shortest term mode when the set mode is terminated.

According to the above patent, the setting of the operating term and the identification of the set term can be easily effected, and the discharge of the lubricating oil can be accurately controlled even after the elapse of the term by compensating for the internal resistance of the electrochemical reactor. Especially, if the set term elapses, the remaining lubricating oil is rapidly discharged by changing the present mode to the shortest term mode.

Though the above-described patent has various advantages as described above, it has the disadvantage that the discharge of the lubricating oil using the electrochemical reaction cannot effect an accurate control of the discharge amount of the lubricating oil. Thus, the applicant has developed a driving apparatus whereby a piston ascends and descends by a driving motor to feed the lubricating oil as much as the volume of a cylinder.

SUMMARY OF THE INVENTION

It is an object of the present invention to solve the problems involved in the prior art, and to provide an automatic lubricating oil feeding method using a microcomputer which can control the display of the remaining operating time by icons on liquid crystal displays (LCDs) after an automatic lubricating oil feeding apparatus is installed to facilitate the identification of the elapse of the operating time, the operation of a motor for discharging a set amount of lubricating oil, and various displays such as the overload of the motor, shortage of a battery capacity, elapse of the lubricating oil replacement time, etc.

In order to achieve the above object, there is provided an automatic lubricating oil feeding method which comprises an initializing step of driving a lubricating oil discharge motor by one revolution when a power is initially supplied, a discharge amount setting step of setting a discharge amount of lubricating oil, an operating term setting step of selecting and setting the number of operating months, a drive control step of controlling an operation of the motor so that the lubricating oil is discharged according to the set number of operating months, and a display step of displaying an elapse of the set operating months and various factors such as a trouble, a shortage of a battery capacity, a replacement time of the lubricating oil, etc., by icons and indicator lamps.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Referring to FIGS. 1A to 1D, according to the automatic lubricating oil feeding method of the present invention, if a battery is inserted and the power is initially supplied from the battery, a microcomputer is initialized (step S101), and drives a lubricating oil discharge motor by one revolution (step S102).

The motor drives a piston of a lubricating oil discharge cylinder, and the lubricating oil is filled in an oil discharge path to effect the discharge of the lubricating oil as much as the volume of the cylinder.

The step of setting the operating mode is performed by a subroutine for scanning keys. At the setting step, the input of a discharge amount selection key is detected (step S201). For instance, if a 250 cc mode key is inputted within a predetermined time, the discharge amount for a time is set to 250 cc, while if the 250 cc mode key is not inputted within the predetermined time, the discharge amount is set to 125 cc which is a basic set value (steps S202 to S205).

Figure 1A:
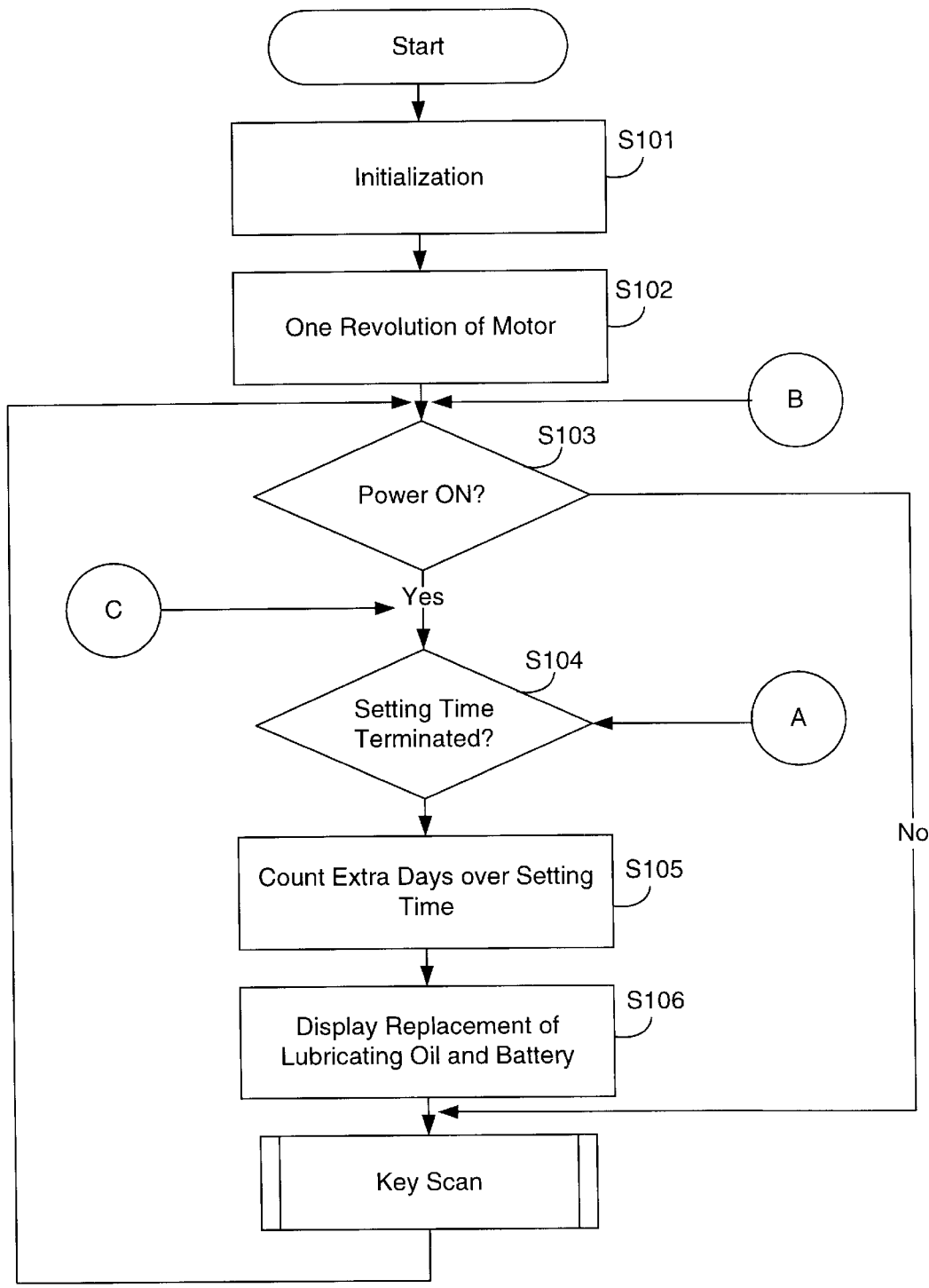
FIGS. 1A, 1B, 1C and 1D are a flowchart illustrating the automatic lubricating oil feeding process according to the present invention.
Figure 1B:
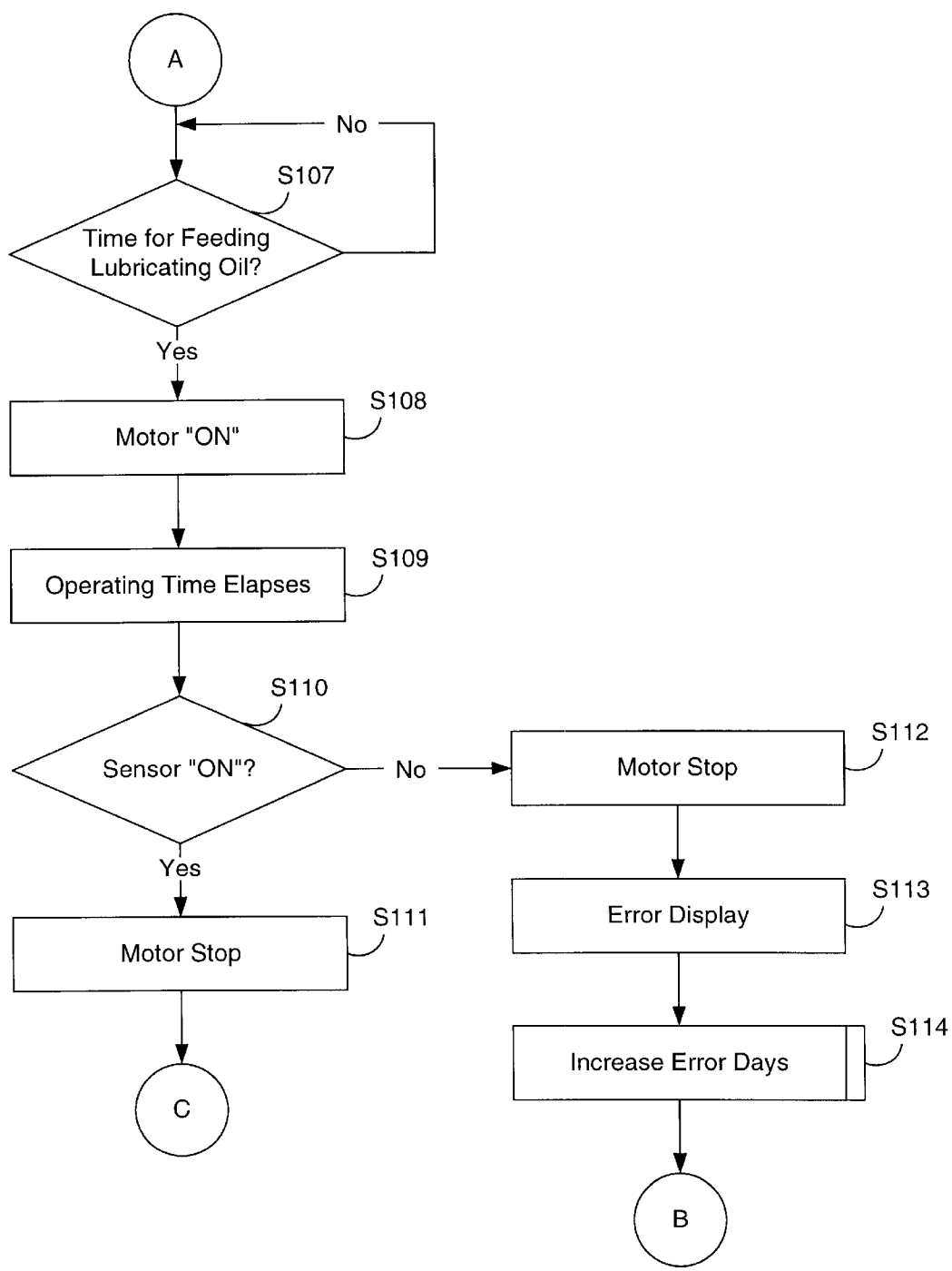
Figure 1C:
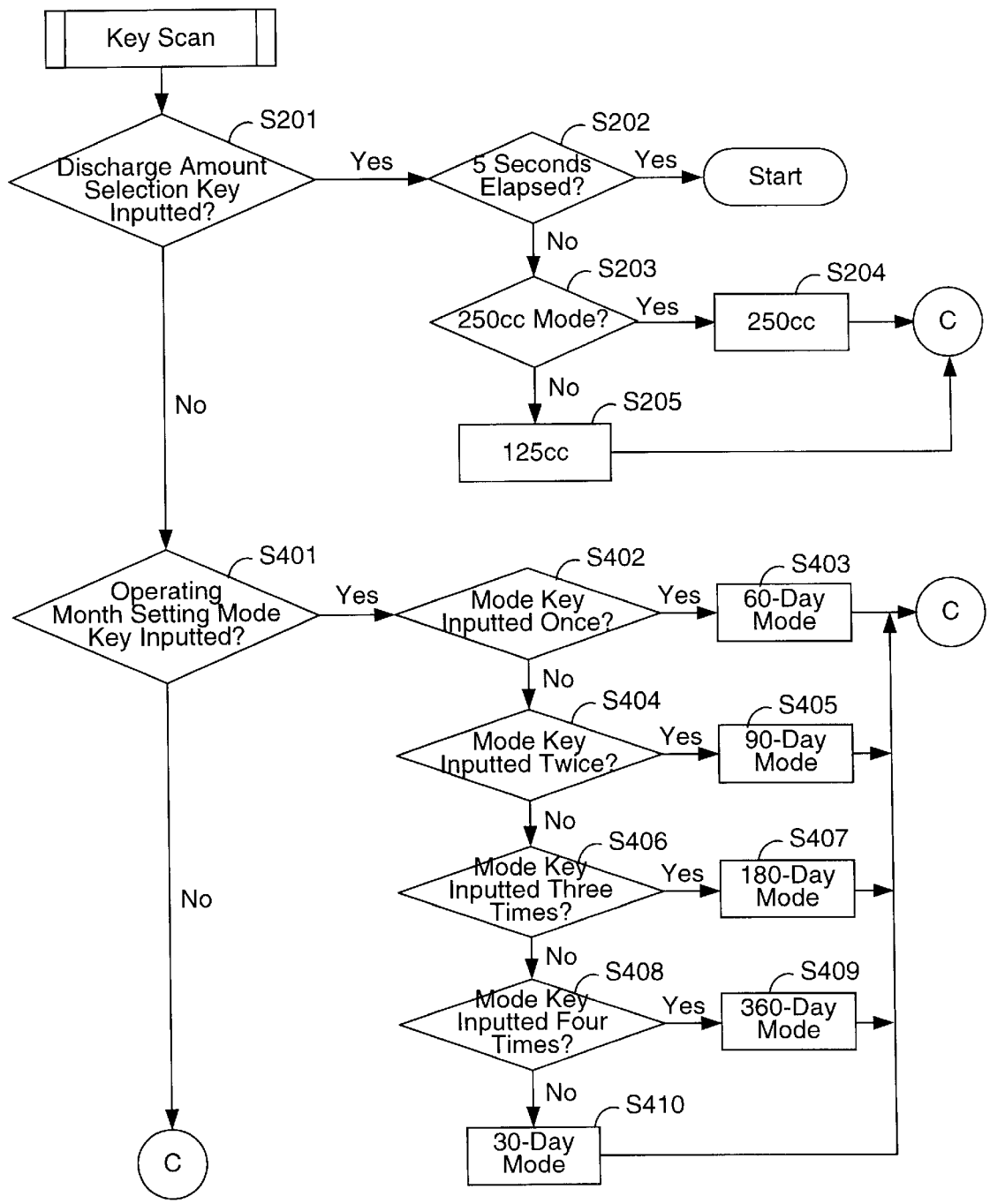
Figure 1D:
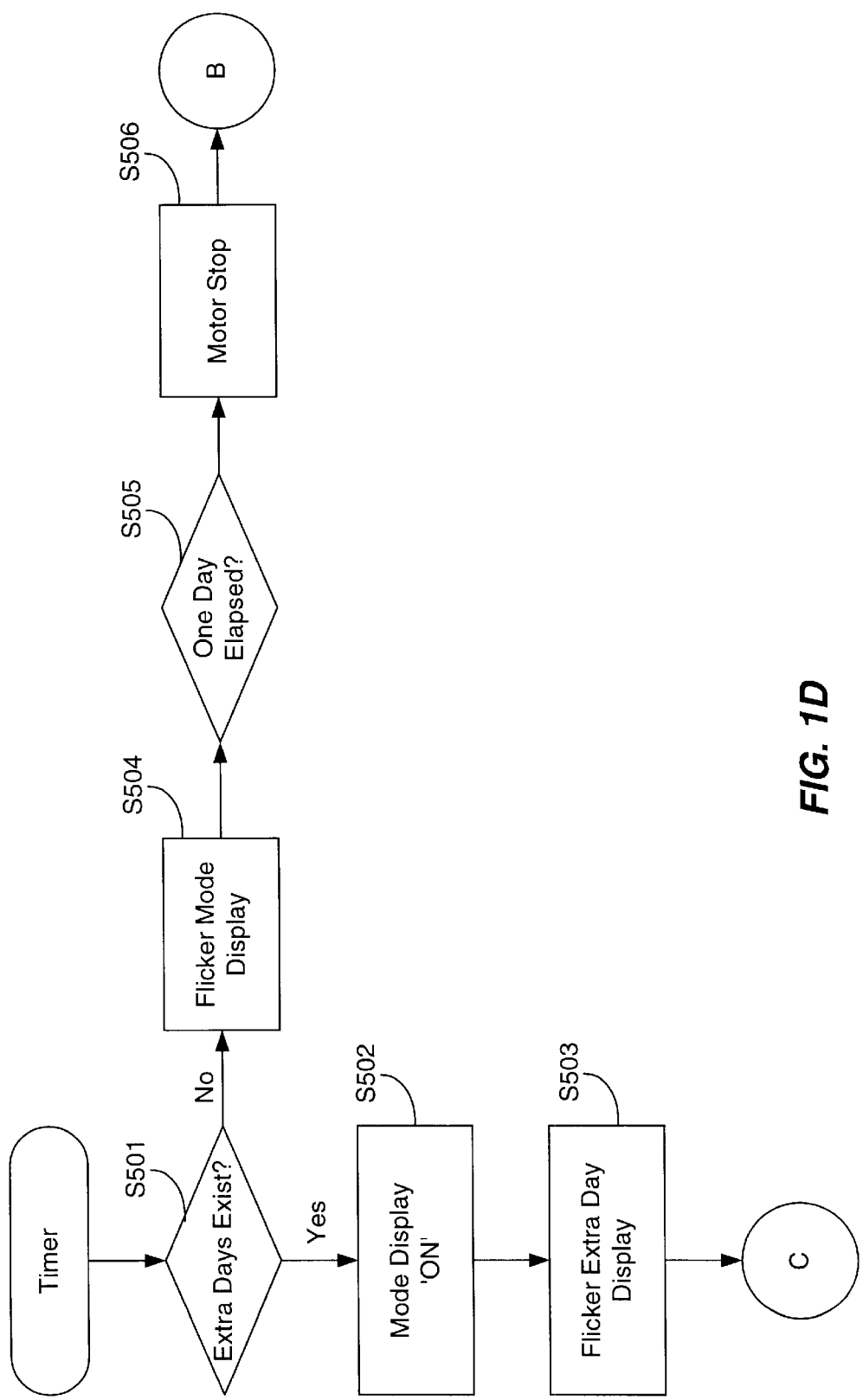

In the embodiment of the present invention, the setting of the operating months is performed by 5 grades. Specifically, the setting grade is selected by detecting the input number of the operating month setting mode key (step S401). For instance, if the operating month setting mode key is once inputted (step S402), a 60-day mode is set by adding 30 days to a basic set value of 30 days (step S403), and if the key is twice inputted, a 90-day mode is set (steps S404 and S405). Also, if the key is inputted three times, a 180-day mode is set (steps S406 and S407, while if the key is inputted four times, a 360-day mode is set (steps S408 and S409). If the operating month setting mode key is not inputted, the system defaults to the basic set value of 30 days (S410), as shown in FIG 1C.

The set value in the key scan mode as described above will be used as a target value for the control of the lubricating oil discharge.

Referring again to FIG. 1A, if a power switch is turned on after the initialization (step S103), the microcomputer detects whether the set days have passed (step S104), and if not, the microcomputer then detects whether now is the time for lubricating oil feeding (step S107).

The frequency of the lubricating oil feeding is changed according to the set number of operating months and the set discharge amount for a time, and is controlled by an operation algorithm programmed in the microcomputer.

If the lubricating oil feeding time is up, the microcomputer drives the motor (step S108) for a set operating time (for instance, for about 30 seconds) which is required for discharging the lubricating oil (step S109). Thereafter, if the lubricating oil discharge operation is performed within the set operating time, a sensor for detecting the regular position of the motor is turned on (step S110) to stop the motor (step S111), so that the normal lubricating oil discharge operation is performed.

On the contrary, if no detected signal is inputted from the sensor by the set operating time, the microcomputer immediately stops the motor (step S112), displays the error (step S113), and then records in a memory the number of days where the lubricating oil is not discharged after increasing the number by 1 (step S114). This is for informing the user of the total number of days where the lubricating oil is not discharged due to the overload of the motor and so on.

If the lubricating oil is discharged by the driving motor and the set operating time is terminated (step S104), the microcomputer counts and displays the extra days over the set time (step S105), and displays on the LCD the oil replacement and the battery replacement (step S106).

Meanwhile, in order to control the feeding operation according to the set operating days, the timer detects the excess of the set operating days (step S501). If the number of operating days exceeds the set value, the timer turns on the mode display (step S502) and displays the extra days over the set operating days (step S503), while if not, the timer flickers the mode display (step S504) and detects whether one day elapses thereafter (step S505), so that the timer down-counts the extra days for every one-day elapse and displays the down-counted extra days (step S506) to return to the main routine.

According to the present invention, the discharge state of the lubricating oil, information required in the discharge process, and user setting values for the discharge of the lubricating oil can be clearly displayed as well as the state of the battery, request of oil replacement, number of non-operating days where the lubricating oil is not discharged due to the overload of the motor, and extra days over the set operating days, so that the user can accurately identify the lubricating oil feeding state.

From the foregoing, it will be apparent that the present invention provides the advantages that it can facilitate the user identification of the state of the lubricating oil feeding apparatus in a manner that it controls the display of the remaining operating time on the LCD after the automatic lubricating oil feeding apparatus is installed, display of the operation of a motor for discharging the set amount of the lubricating oil, and various displays such as the overload of the motor, shortage of the battery capacity, elapse of the lubricating oil replacement time, etc, by icons on the LCD.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic lubricating oil feeding method for a lubricating oil feeding apparatus using a microcomputer comprising:

an initializing step of initializing the microcomputer and driving a lubricating oil discharge motor by one revolution when a power is initially supplied;

a discharge amount setting step of setting a discharge amount of lubricating oil;

an operating term setting step of selecting and setting the number of operating months;

a drive control step of controlling an operation of the motor so that the lubricating oil is discharged according to the set number of operating months; and a display step of displaying by icons and indicator lamps an elapse of the set operating months and a trouble or operating state of the apparatus during operation of the apparatus.

2. The automatic lubricating oil feeding method as claimed in claim 1, further comprising a display step of displaying a replacement request of the lubricating oil and a battery after an elapse of the set operating months.

3. The automatic lubricating oil feeding method as claimed in claim 1, wherein the lubricating oil discharge amount setting step comprises a substep of setting the discharge amount to 125 cc or 250 cc by driving the motor once or twice according to a volume of a cylinder for discharging the lubricating oil.

4. The automatic lubricating oil feeding method as claimed in claim 1, further comprising a step of detecting, counting, and displaying the number of non-discharging days where the discharge of the lubricating oil is not performed within a preset time due to an overload of the motor during the operation of the apparatus.

5. The automatic lubricating oil feeding method as claimed in claim 1, further including:

setting a discharge amount of lubricating oil.

6. The automatic lubricating oil feeding method as claimed in claim 1, further including:

detecting non-discharging days where the discharge of the lubricating oil is not performed within a preset time.

7. An automatic lubricating oil feeding method for a lubricating oil feeding apparatus using a microcomputer comprising:

initializing the microcomputer and operating a lubricating oil discharge device to fill an oil discharge path when a power is initially supplied;

setting a period of operating time;

controlling an operation of the discharge device so that the lubricating oil is discharged according to the set period of operating time; and displaying an operating state of the apparatus during operation of the apparatus.

8. The automatic lubricating oil feeding method as claimed in claim 1, wherein said displaying further includes displaying an elapse of the set operating time.

9. The automatic lubricating oil feeding method as claimed in claim 8, wherein said displaying further includes displaying a replacement request of the lubricating oil and a battery after an elapse of the set operating months.

10. The automatic lubricating oil feeding method as claimed in claim 9, wherein said displaying includes the display of icons and indicator lamps.

11. An automatic lubricating oil feeding method for a lubricating oil feeding apparatus using a microcomputer comprising:

initializing the microcomputer and operating a lubricating oil discharge device to fill an oil discharge path to effect the discharge of the lubricating oil therefrom when a power is initially supplied;

setting a discharge amount of lubricating oil;

setting a period of operating time; and controlling an operation of the discharge device so that the lubricating oil is discharged from the oil discharge path according to the set period of operating time.

12. The automatic lubricating oil feeding method as claimed in claim 11, further including:

detecting non-discharging days where the discharge of the lubricating oil is not performed within a preset time.

13. The automatic lubricating oil feeding method as claimed in claim 11, further including:

displaying an elapse of the set operating time, and an operating state of the apparatus during operation of the apparatus.

14. The automatic lubricating oil feeding method as claimed in claim 13, wherein said displaying further includes displaying a replacement request of the lubricating oil and a battery after an elapse of the set operating months.

15. The automatic lubricating oil feeding method as claimed in claim 14, wherein said displaying includes the display of icons and indicator lamps.

\* \* \* \* \*